US009554275B1

(12) United States Patent
Bantoft et al.

(10) Patent No.: US 9,554,275 B1
(45) Date of Patent: Jan. 24, 2017

(54) VOICE AND SMS COMMUNICATION FROM A MOBILE DEVICE OVER IP NETWORK AND SATELLITE OR OTHER COMMUNICATION NETWORK

(71) Applicant: Satcom Direct, Inc., Satellite Beach, FL (US)

(72) Inventors: Ken Bantoft, Oakville (CA); Curt Allen Gray, Glendale, AZ (US)

(73) Assignee: Satcom Direct, Inc., Melbourne, FL (US)

( * ) Notice: Subject to any disclaimer, the term of this patent is extended or adjusted under 35 U.S.C. 154(b) by 0 days.

(21) Appl. No.: 14/885,678

(22) Filed: Oct. 16, 2015

Related U.S. Application Data

(60) Provisional application No. 62/065,742, filed on Oct. 19, 2014.

(51) Int. Cl.
*H04W 12/06* (2009.01)
*H04L 29/08* (2006.01)
(Continued)

(52) U.S. Cl.
CPC .......... *H04W 12/06* (2013.01); *H04L 65/1006* (2013.01); *H04L 67/104* (2013.01);
(Continued)

(58) Field of Classification Search
CPC ............ H04B 7/18506; H04B 7/18508; H04B 7/18558; H04B 7/18567; H04B 7/18513; H04W 84/06; H04W 84/005
(Continued)

(56) References Cited

U.S. PATENT DOCUMENTS 4,037,905 A 7/1977 Lucas
5,493,309 A 2/1996 Bjornholt
(Continued)

FOREIGN PATENT DOCUMENTS

| JP | 2007134498 | 11/2007 |
|---|---|---|
| WO | 2008139062 | 11/2008 |
| WO | 2009097042 | 8/2009 |

OTHER PUBLICATIONS

Marpe, et al, A Two-Layered Wavelet-Based Algorithm for Efficient Lossless and Lossy Image Compression, IEEE, Transactions on Circuits and Systems for Video Technology, 2000, pp. 1094-1102, vol. 10, No. 7.

(Continued)

*Primary Examiner* — Ronald Eisner
(74) *Attorney, Agent, or Firm* — Brian S. Steinberger; Law Offices of Brian S. Steinberger, P.A.

(57) ABSTRACT

Systems, devices, and methods for communication system that includes a mobile application (software) installed on a user mobile device, a communications gateway, capable of performing EAP-SIM and/or EAP-AKA WPA2 wireless authentication & authorization, a Ground-based gateway, capable of proxying RADIUS messages, handling SIP communications and SMPP (SMS) messaging, and an integrated communications gateway platform (ICP), capable of performing the functions of a BTS, VLR and SIP/SMPP communications router. The systems, devices and methods allows for vehicle passengers, such as aircraft passengers the capability to use their mobile communication devices, such as smart phones and their smart phone numbers to send and receive calls and text messages to remote communication devices anywhere in the world while on the aircraft, wherein the remote communication devices display the phone numbers of the mobile communication devices.

14 Claims, 2 Drawing Sheets

(51) Int. Cl.
*H04L 29/06* (2006.01)
*H04W 4/12* (2009.01)
*H04W 60/00* (2009.01)
*H04M 7/00* (2006.01)

(52) U.S. Cl.
CPC ............ *H04L 67/12* (2013.01); *H04M 7/006* (2013.01); *H04W 4/12* (2013.01); *H04W 60/005* (2013.01)

(58) Field of Classification Search
USPC .................................................. 455/427–431
See application file for complete search history.

(56) References Cited

U.S. PATENT DOCUMENTS

| | | | |
|---|---|---|---|
| 5,937,349 A | 8/1999 | Andresen | |
| 5,959,560 A | 9/1999 | Said | |
| 6,014,606 A | 1/2000 | Tu | |
| 6,151,497 A | 11/2000 | Yee | |
| 6,201,797 B1 | 3/2001 | Leuca | |
| 6,400,945 B1 | 6/2002 | Jensen | |
| 6,529,820 B2 | 3/2003 | Tomescu | |
| 6,741,841 B1 * | 5/2004 | Mitchell | H04B 7/18508 348/E7.093 |
| 6,781,968 B1 * | 8/2004 | Colella | H04B 7/18504 342/354 |
| 6,892,069 B1 | 5/2005 | Flynn | |
| 6,954,794 B2 | 10/2005 | Rudd et al. | |
| 6,970,704 B2 | 11/2005 | Jensen | |
| 6,978,128 B1 | 12/2005 | Raman | |
| 7,023,365 B1 | 4/2006 | Mitchell | |
| 7,027,898 B1 | 4/2006 | Leger et al. | |
| 7,177,939 B2 | 2/2007 | Nelson et al. | |
| 7,209,978 B2 | 4/2007 | Thubert et al. | |
| 7,436,762 B2 | 10/2008 | Oka et al. | |
| 7,660,579 B2 | 2/2010 | Jensen | |
| 7,668,632 B2 | 2/2010 | Vian | |
| 7,739,167 B2 | 6/2010 | Breen | |
| 7,761,793 B1 | 7/2010 | Mitchell | |
| 7,852,819 B2 | 12/2010 | Gil | |
| 7,908,077 B2 | 3/2011 | Smith | |
| 8,305,936 B2 | 11/2012 | Wang | |
| 8,339,991 B2 | 12/2012 | Biswas | |
| 8,369,812 B2 | 2/2013 | Lehman | |
| 8,432,808 B1 | 4/2013 | Dankberg et al. | |
| 8,477,771 B2 | 7/2013 | Biswas | |
| 8,527,662 B2 | 9/2013 | Biswas | |
| 8,594,931 B2 | 11/2013 | Sterkel | |
| 8,762,047 B2 | 6/2014 | Sterkel | |
| 9,008,868 B1 | 4/2015 | Bantoft | |
| 9,318,024 B1 | 4/2016 | Natwick et al. | |
| 2003/0055975 A1 | 3/2003 | Nelson et al. | |
| 2003/0093187 A1 | 5/2003 | Walker | |
| 2003/0123481 A1 | 7/2003 | Neale et al. | |
| 2004/0064588 A1 | 4/2004 | Jungck | |
| 2005/0041859 A1 | 2/2005 | Nguyen | |
| 2005/0053026 A1 | 3/2005 | Mullan et al. | |
| 2005/0083358 A1 | 4/2005 | Lapstun | |
| 2005/0177647 A1 | 8/2005 | Anantha et al. | |
| 2005/0187677 A1 | 8/2005 | Walker | |
| 2005/0215238 A1 | 9/2005 | Macaluso | |
| 2005/0215249 A1 | 9/2005 | Little | |
| 2005/0220055 A1 | 10/2005 | Nelson et al. | |
| 2005/0244060 A1 | 11/2005 | Nagarajan | |
| 2006/0013264 A1 | 1/2006 | Eichler et al. | |
| 2006/0092897 A1 | 5/2006 | Pirila et al. | |
| 2006/0115164 A1 | 6/2006 | Cooley | |
| 2006/0156357 A1 | 7/2006 | Lockridge et al. | |
| 2006/0293049 A1 | 12/2006 | Jensen | |
| 2007/0123290 A1 | 5/2007 | Stenmark | |
| 2008/0182573 A1 | 7/2008 | Lauer et al. | |
| 2009/0023403 A1 | 1/2009 | LaBerge | |
| 2009/0109849 A1 | 4/2009 | Wood et al. | |
| 2009/0239475 A1 | 9/2009 | Lehman | |
| 2009/0304096 A1 | 12/2009 | Khattab et al. | |
| 2010/0027461 A1 | 2/2010 | Bothorel | |
| 2010/0035607 A1 | 2/2010 | Horr et al. | |
| 2010/0167723 A1 | 7/2010 | Soumier | |
| 2010/0217458 A1 | 8/2010 | Schweiger | |
| 2010/0279698 A1 | 11/2010 | Wong | |
| 2011/0046842 A1 | 2/2011 | Smith | |
| 2011/0046920 A1 | 2/2011 | Amis | |
| 2011/0063980 A1 | 3/2011 | Kondo | |
| 2011/0114726 A1 | 5/2011 | Porter et al. | |
| 2011/0149849 A1 | 6/2011 | Brownrig | |
| 2011/0255506 A1 | 10/2011 | Toth et al. | |
| 2012/0033851 A1 | 2/2012 | Chen et al. | |
| 2012/0083971 A1 | 4/2012 | Preston | |
| 2012/0109447 A1 | 5/2012 | Yousefi et al. | |
| 2012/0166576 A1 | 6/2012 | Orsini | |
| 2012/0232782 A1 | 9/2012 | Sterkel | |
| 2012/0232791 A1 | 9/2012 | Sterkel | |
| 2012/0303826 A1 | 11/2012 | Nelson et al. | |
| 2013/0103786 A1 | 4/2013 | Miglore | |
| 2013/0120166 A1 | 5/2013 | Kommuri et al. | |
| 2013/0158821 A1 | 6/2013 | Ricci | |
| 2013/0219429 A1 | 8/2013 | Hirsch | |
| 2013/0235728 A1 | 9/2013 | Le et al. | |
| 2013/0283305 A1 | 10/2013 | Hirsch | |
| 2013/0297103 A1 | 11/2013 | Baker et al. | |
| 2014/0024395 A1 | 1/2014 | Johnson | |
| 2014/0045420 A1 | 2/2014 | Tong | |
| 2014/0045520 A1 | 2/2014 | Lim et al. | |
| 2014/0053243 A1 | 2/2014 | Walsh | |
| 2014/0081483 A1 | 3/2014 | Weinmann | |
| 2014/0137162 A1 | 5/2014 | McNamee et al. | |
| 2014/0248588 A1 | 9/2014 | Williams | |
| 2014/0282038 A1 | 9/2014 | Royster | |
| 2014/0315166 A1 | 10/2014 | Williams | |
| 2015/0243112 A1 | 8/2015 | Jensen et al. | |

OTHER PUBLICATIONS

Linux man page, gzip, gunzip, zcat—compress or expand files, 2002, 7 pages.
Rockwell Collins, EBACE 2012 Press Kit, 2012, http://www.rockwellcollins.com/sitecore/content/Data/News/2012_2012_Yr/CS/FY12CSN . . . , 2 pages.
Vandel, et al., Head-Up Guidance Systems Technology—A Clear Path to Increasing Flight Safety, Flight Safety Foundation, 2009, 29 pages.
Rockwell Collins, Ascend Mobile Applications, 2012, 2 pages.
Rockwell Collins, Falcon Cabin HD, Elevate your flight experience, 2012, 12 pages.
Rockwell Collins, Pro Line Fusion Advanced Avionics, 2011, 8 pages.
Rockwell Collins, Venue High-Definition Cabin Management system, 2012, 12 pages.
Rockwell Collins, Rockwell Collins to provide advanced cabin management and HD entertainment system for Falcon 7X and Falcon 900LX, News Release, 2012, 1 page.
Rockwell Collins, Jet Aviation St. Louis to install Rockwell Collins/Venue HD cabin system on a Global Express, News Release, 2012, 2 pages.
Rockwell Collins, Airshow 4000, retrieved on Oct. 4, 2013, retrieved from http://www.rockwellcollins.com/sirecore/cotent/Data/Products/Cabin/Moving_Map_system . . . , 2 pages.
Rockwell Collins, Airshow App for Mobile Devices, 2012, 4 pages.
Rockwell Collins, Airshow 4000 Version 2, 2013, 9 pages.

* cited by examiner

FIG. 2

100
Phone is loaded on App., and Mobile Positioning file is loaded on iOS (one time).
    110 Configure an account using your mobile number.

200
Connect to WiFi network GlobalVT (you still have access to internet and everything else-just a different SSID)
    210 During authentication, your mobile device sends it's SIM information (encrypted) to the ground, which notifies your carrier you will be roaming. During authentication, the device can use EAP-SIM and/or EAP-AKA to validate it's identity with the carrier, and indicate it would like to 'roam' on another carrier's network.

300
Open the App., it will register with the ground, which will notify your carrier you are available through the GlobalVT network.

400
Make/receive calls and SMS messages from within the Global VT App.

VOICE AND SMS COMMUNICATION FROM A MOBILE DEVICE OVER IP NETWORK AND SATELLITE OR OTHER COMMUNICATION NETWORK

CROSS REFERENCE TO RELATED APPLICATIONS

This application claims the benefit of priority to U.S. Provisional Application Ser. No. 62/065,742 filed Oct. 19, 2014, the entire disclosure of which is incorporated by reference.

FIELD OF INVENTION

This invention relates to wireless communication, and in particular to systems, devices, and methods for communication systems to allow voice and SMS (short message service) communications from a portable digital communication device, such as but not limited to a smart phone, which is connected to a wireless network over an IP (internet protocol) network over a satellite network or other communications network.

BACKGROUND AND PRIOR ART

Calls made from a mobile phone on an aircraft do not resolve to the user's personal telephone number and features like caller ID (which identifies the caller's phone number) will not work to display the user's own name or number. Similarly, calls to the user's mobile phone cannot be made by dialing the user's own number, and instead can only be made by dialing some alternative number specific to aircraft or satellite equipment (if the call can even be completed at all). SMS (short message service) text functionality is similarly limited or impaired, such that text messages do not clearly come from the user, nor can they be sent to the user's GSM (global system for mobile communications) number.

Additionally, the use of GSM Picocells or Femtocells onboard aircraft, while solving the above problems somewhat, are prohibited by the FAA (Federal Aviation Administration) in United States airspace, and other regulatory bodies prohibit them in several other countries. The installation of these Picocell/Femtocells also require the airplane cabin be removed to install shielding, RF (radio frequency) lines and other modifications which greatly increase the installation cost and complexity.

Thus, the need exists for solutions to the above problems with the prior art.

With the subject invention, these problems are solved, and the user experience with an individual mobile device while in flight parallels the experience on the ground, making communications simpler, more user-friendly and more intuitive for all parties.

SUMMARY OF THE INVENTION

A primary objective of the present invention is to provide systems, devices, and methods for using extensible authentication protocol-subscriber identity module (EAP-SIM, EAP-AKA) wireless authentication to authorize a portable digital communication device (mobile communication device), such as a smart phone, tablet, laptop, and the like, on the network by contacting the mobile user's cellular provider.

A secondary objective of the present invention is to provide systems, devices, and methods for use of a ground based radius proxy and VLR (Visitor Locator Registry) to resolve the International Mobile Subscriber Identity/Integrated Circuit Card Identifier (IMSI/ICCID) to a valid number for use in enabling cellular roaming.

A third objective of the present invention is to provide systems, devices, and methods for using a Mobile Voice+SMS application installed on the mobile device, such as but not limited to a smart phone, and the like, which allows the mobile user to send and receive SMS (short message service) messages, as well as send and receive voice calls using their normal mobile telephone number.

An embodiment of the novel communication system can include a mobile software application installed on a mobile user device having a telephone number, a communications gateway installed on a transportation vehicle for providing wireless authentication and authorization with the mobile communication device, a Ground-based gateway, for proxying messages, handling communications and messaging with the mobile communication device, and an integrated communications gateway platform (ICP) for providing functions of a BTS (Base Transceiver System), VLR (Visitors Location Register) and SIP/SMPP (Session Initiation Protocol/Short Message Peer-to-Peer Protocol) communications router with the mobile communications device.

The wireless authentication and authorization can include an EAP-SIM (Extensible Authentication Protocol and Subscriber Identity Module) and/or EAP-AKA (Authentication and Key Agreement) Wi-Fi Protected Access 2, wireless authentication and authorization.

The Ground-based gateway can be used for proxying RADIUS (Remote Authentication Dial-In User Service) messages, handling SIP (Session Initiation Protocol) communications and SMPP (Short Message Peer-to-Peer Protocol) SMS (short message services) messaging.

The communications gateway can include satellite, air-to-ground and terrestrial communication links.

The mobile application can include a voice and SMS (short message service) communications to the mobile device, a first registration with a ground based gateway as a SIP and SMPP client to allow VoIP (Voice Over Internet Protocol) and SMS signaling and communication, and a second registration with the Ground based gateway to trigger cellular roaming to provide the mobile User's telephone number to the Ground based gateway, which then proxies the registration request to the ICP (Integrated Communications Platform).

The communication gateway can be installed on a mode of transportation for providing WPA2 (Wi-Fi Protected Access) Enterprise via EAP-SIM and/or EAP-AKA wireless authentication for the mobile device.

A preferred mode of transportation for the invention can be for an aircraft.

The EAP-SIM/EAP-AKA authorization can use the SIM (subscriber identity module) information inside the mobile device, and requests authorization from the mobile user's MO (mobile operator) to confirm a valid subscription for voice, SMS and roaming services.

The ground based gateway can provide a communications proxy or relay, wherein the gateway proxies the authentication from the communications gateway to the ICP.

The ground based gateway can provide an SIP and SMPP gateway for the mobile software application, allowing voice and data to be routed from the ICP to the mobile user device.

The ground based gateway can provide administrative functions, including housing the subscriber database of MSISDN (Mobile Station International Subscriber Directory Number used to identify a mobile phone number internationally) and phone numbers, and IMSI/ICCID (International Mobile Subscriber Identity/Integrated Circuit Card Identifier) information for mobile device users.

The mobile device can include a smart phone, and/or a mobile communication device is selected from a laptop computer, a tablet computer, and a portable computer.

The communication system can further include communications between the mobile communication device and a remote communication device, which provides the remote communication device with display of the telephone number of the mobile communication device during calls and text messages between the mobile communication device and the remote communication device.

A method of sending and receiving calls and SMS messaging from a mobile communication device onboard an aircraft, can include the steps of providing a mobile communication device with a personal phone number on transportation vehicle, providing the transportation vehicle with a router, loading the mobile communication device with a downloadable app, connecting the mobile communication device to a network for authentication, opening the app to register the mobile communication device with a ground location, and sending and receiving calls from a remote communication device to the mobile communication device on the transportation vehicle at any time and location.

The transportation vehicle can include an aircraft.

The mobile communication device can include a smart phone, and/or a mobile communication device is selected from a laptop or tablet computer, or portable computer.

The method can further include the step of displaying the personal phone number of the mobile communication device on the remote communication device during calls and text messages between the mobile communication device and the remote communication device.

Further objects and advantages of this invention will be apparent from the following detailed description of the presently preferred embodiments, which are illustrated, schematically in the accompanying drawings.

BRIEF DESCRIPTION OF THE FIGURES

FIG. 2 are flowchart steps for loading and running a mobile personal digital communication device, such as a personal smart phone with a novel phone app.

DESCRIPTION OF THE PREFERRED EMBODIMENTS

Figure 1:
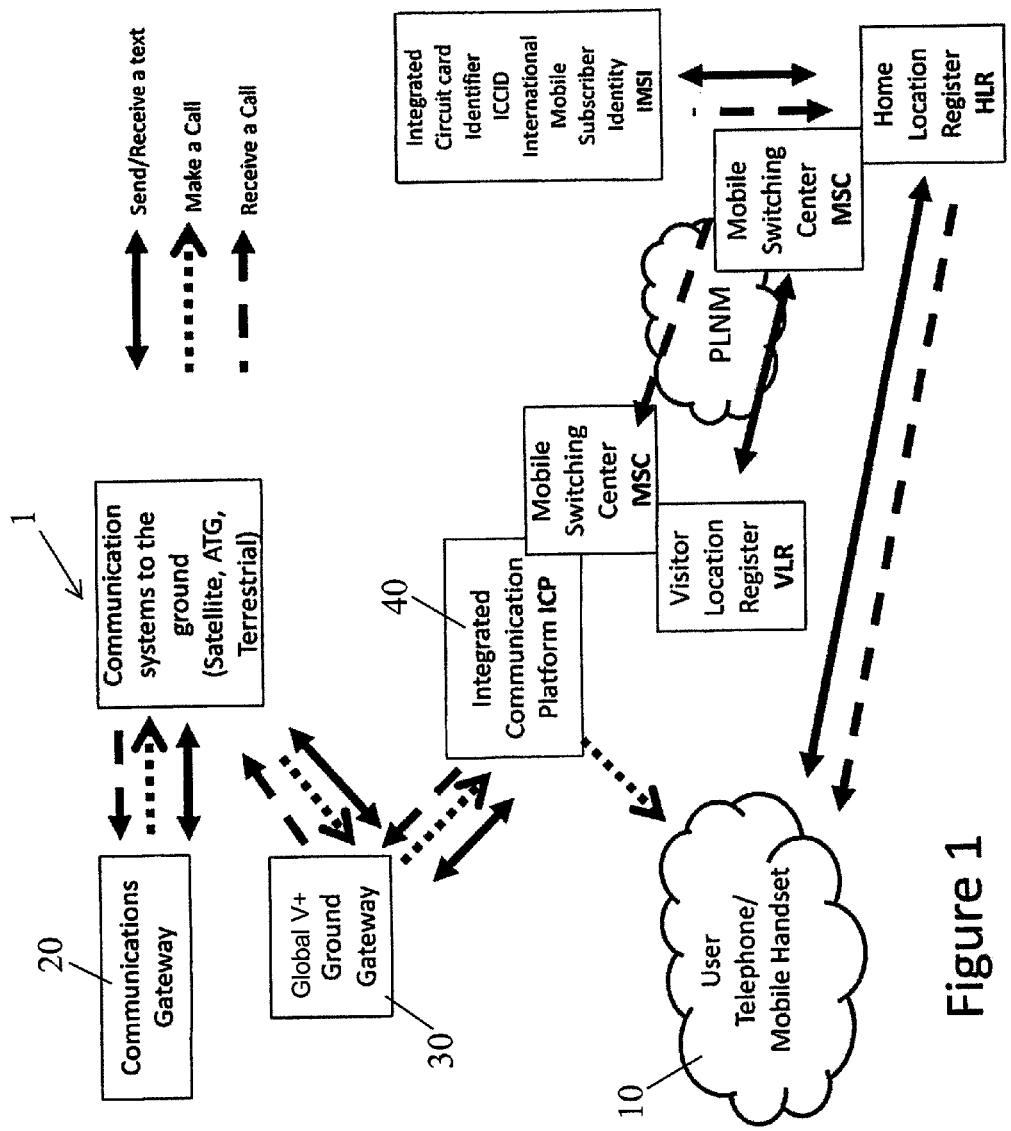
FIG. 1 is a block diagram of the communication system of the present invention.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of acronyms will now be described.

GlobalVT Voice over Internet Protocol (VoIP) and short message service (SMS) text messaging solution designed and built specifically for aviation applications
BTS Base Transceiver System
EAP Extensible Authentication Protocol
FAA Federal Aviation Administration
GlobalVT novel global voice and text system
GSM Global System for Mobile Communications
HLR Home Location Register
ICCID Integrated Circuit Card Identifier
ICP Integrated Communications Platform
IMSI International Mobile Subscriber Identity
IP Internet Protocol
IMSI International Mobile Subscriber Identity
MSC Mobile Switching Center
MSISDN Mobile Station International Subscriber Directory Number used to identify a mobile phone number internationally
MO Mobile Operator
RADIUS Remote Authentication Dial-In User Service
RF Radio Frequency
SDR Satcom Direct Router
SIM Subscriber Identity Module
SIP Session Initiation Protocol
SMPP Short Message Peer-to-Peer Protocol
SMS Short Message Services for sending text messages from smart phones
VLR Visitors Location Register
VoIP Voice Over Internet Protocol
WPA2 Wi-Fi Protected Access 2

A listing of the components will now be described.
1 GlobalVT (global voice and text) communication system
10 mobile device (such as a portable digital communication device, i.e. smart phone) and mobile user(s)
20 communications gateway
30 Ground-based gateway
40 ICP (integrated communications gateway platform)

As shown in FIG. 1, the communication system of the present invention relates to four part system that includes a mobile application (software) installed on a mobile device 10, such as but not limited to a portable digital communication, such as a smart phone, and the like. The communication system 1 can further include a communications gateway 20, capable of performing EAP-SIM (Extensible Authentication Protocol and Subscriber Identity Module) and/or EAP-AKA WPA2 (Wi-Fi Protected Access 2) wireless authentication and authorization. The system 1 can further include a ground-based gateway 30, capable of proxying RADIUS (Remote Authentication Dial-In User Service) messages, handling SIP (Session Initiation Protocol) communications and SMPP (Short Message Peer-to-Peer Protocol) SMS (short message services) messaging.

System 1 can further include an ICP (integrated communications gateway platform) 40, capable of performing the functions of a BTS (Base Transceiver System), VLR (Visitor Location Register) and SIP/SMPP (Session Initiation Protocol/Short Message Peer-to-Peer Protocol) communications router.

The mobile application provides the voice and SMS (short message service) communications to the mobile user and registers with the ground based gateway as a SIP (Session Initiation Protocol) and SMPP (Short Message Peer-to-Peer Protocol) client, allowing VoIP (Voice Over Internet Protocol) and SMS signaling and communication. The mobile application also registers with the ground based gateway 30 to trigger cellular roaming, providing a mobile user's telephone number 10 to the ground based gateway 30, which then proxies the registration request to the ICP (integrated communications gateway platform) 40. The mobile Application is the mobile users interface to the system 1, acting like a traditional phone dialer and SMS 'inbox', nearly identical in functionality to the mobile device's 10 native phone dialer and SMS messaging system.

The communications gateway 20, typically installed on the aircraft, vessel or other mode of transportation, provides WPA2 (Wi-Fi Protected Access) Enterprise via EAP-SIM and/or EAP-AKA wireless authentication for the mobile device 10. The EAP-SIM (Extensible Authentication Protocol and Subscriber Identity Module) and/or EAP-AKA (Authentication and Key Agreement) authorization uses the SIM (subscriber identity module) information inside the mobile device 10, and requests authorization from the mobile user's mobile operator to confirm a valid subscription for voice, SMS (short message services) and roaming services. The communications gateway 20 uses information provided by the mobile device's operating system to accomplish this. The communications gateway 20 can optionally assist the mobile device 10 in obtaining better voice call quality by changing the network parameters for the Satellite or other backhaul communications link.

The ground based gateway 30 acts as a communications proxy or relay where it proxies the authentication from the communications gateway 20 to the ICP (Integrated Communications Platform) 40. The ground based gateway 30 also acts as the SIP (Session Initiation Protocol) and SMPP (Short Message Peer-to-Peer Protocol) gateway for the mobile application, allowing voice and data to be routed from the ICP to the mobile user 10. The ground based gateway 30 also provides administrative functions, including housing the subscriber database of MSISDN (Mobile Station International Subscriber Directory Number used to identify a mobile phone number internationally) and phone numbers, and IMSI/ICCID (International Mobile Subscriber Identity/Integrated Circuit Card Identifier) information for the mobile users.

The ICP (Integrated Communications Platform) provides BTS (Base Transceiver Station), VLR (Visitors' Location Register) and other mobile operating functionality. It notifies the mobile user's MO (mobile operator) of roaming events, such as when a mobile user authenticates and starts the mobile application and registers with the Ground based gateway 30, which notifies the ICP (Integrated Communications Platform) the mobile user is available over the system 1. The ICP then notifies the MO's HLR (Home Location Register) that the user is reachable over the ICP's communications network. The ICP also translates the initial provisioning requests from the Ground based gateway 30 and asks the mobile user's MO to resolve the mobile telephone number to an IMSI/ICCID (International Mobile Subscriber Identity/Integrated Circuit Card Identifier), which is provided to the ground based gateway for future use. The ICP also routes inbound (Mobile Terminated) voice calls and SMS (short message services) messages to the Ground based gateway 30. For mobile originated calls, the ICP routes these calls for termination via one or more telecommunications providers.

The invention allows for using personal smartphone numbers for sending and receiving calls and SMS (short message service) messaging from one's own phone numbers.

Features and benefits of the novel GlobalVT system include:

a. Available for aircraft having the SATCOM DIRECT ROUTER (SDR) and GlobalVT, passengers can use their smartphone numbers to text and talk anywhere in the world. The SDR can include the router for aircraft communications described in U.S. patent application Ser. No. 14/259,588 filed Apr. 23, 2014, to the same assignees as the subject patent application.

b. Unlimited, seamless calling between parties c. Availability through all phases of flight—take off to landing.

d. Use of the smart phone contact list for dialing and text messaging, including personalized ringtones and Caller ID settings without the need for additional applications.

e. In-flight messaging and calls are managed through the GlobalVT messaging App. (downloadable App. for the mobile device)

f. Service available over multiple satellite networks.

g. Works over Inmarsat SwiftBroadband, Global Xpress/Jet ConnecX, ViaSat Yonder and Excede, and 3G/4G/LTE h. Over 300 roaming agreements in place to start i. Overcomes known problems associated with latencies providing the user clearer, crisper voice quality. No straining to hear through static, no faraway faint tinny voices for communications both ways between the caller and the mobile user.

In a preferred embodiment, the GlobalVT system 1 can utilize the SDR (Satcom Direct Router) to be the WiFi AP. The SDR can include invention described in U.S. patent application Ser. No. 14/259,588 filed Apr. 23, 2014, to the same assignee as the subject patent application, which is incorporated by reference in its' entirety.

The Satcom Direct Router (SDR) methods, systems, and devices in U.S. patent application Ser. No. 14/259,588 filed Apr. 23, 2014, incorporates various products described in U.S. Patent Applications, each assigned to Satcom Direct, Inc. the same assignee as this patent application. Specifically, the SDR incorporates the following inventions which are all incorporated by reference in their entirety:

U.S. Provisional Patent Application No. 61/889,183 filed on Oct. 10, 2013, now U.S. patent application Ser. No. 14/259,796 filed Apr. 23, 2014, by the same inventor and assignee of the subject invention, describes system and method for mobile ground-to-air and air-to-ground communication network acceleration. The system and method can reduce the cost of airborne communication services by creating a faster connection and thus increasing data throughput. In one embodiment, the communication network acceleration system and method provide as much as a four-fold increase over standard high-speed data rates. This increase is made possible in part through the integration, implementation, and use of acceleration and compression technologies in the ground system that supports communications to and from an airborne terminal.

U.S. Provisional Patent Application No. 61/888,574 filed on Oct. 9, 2013, filed as U.S. patent application Ser. No.

14/297,146, now U.S. Pat. No. 9,008,868, by the same inventor and assignee of the subject invention, describes methods and systems for use of a centrally managed, 'Cloud' based system that is responsible for management on onboard avionics equipment. Specifically, this invention relates to a system whereby an avionics device will communicate with a centrally location "Cloud" system for command and control of both predefined and arbitrary tasks or functions that the onboard avionics will perform.

U.S. Provisional Patent Application No. 61/888,593 filed Oct. 9, 2013, by the same inventor and assignee of the subject invention, describes methods and systems that can manage multiple different connection types for Air-to-Ground and Ground-to-Air communications. This system actively monitors the different connections types, and switches traffic to the highest priority functioning connection. Furthermore, it does this while maintaining the connections of Internet TCP/IP traffic that is passing through the system, allowing passenger or system traffic to remain connected.

U.S. Provisional Patent Application No. 61/888,600 filed Oct. 9, 2013, now U.S. patent application Ser. No. 14/309,084 filed Jun. 19, 2014, by the same inventor and assignee of the subject invention, describes a capability which requires aircraft passengers who wish to use Internet Access while onboard on aircraft to watch a mandatory safety briefing video prior to being granted Internet access. During the use of personal electronics devices PED onboard an aircraft, the PEDS connect to an onboard wireless access point (WiFi). Either through onboard avionics equipment, or through a centrally managed ground based infrastructure, the passenger is required to watch a safety briefing video, with our without additional commercial or educations messages, before the PED is allowed access to the Internet. This is similar to many 'WiFi Hotspots' whereby the owner/operations of such require the viewing of advertisement or other communication content prior to being granted Internet access.

In a preferred embodiment, aircraft using the invention generally will need SDR with an GlobalVT license as well as Inmarsat Swiftbroadband or ViaSat Yonder service.

Service can work over Aircell ATG (Gogo Biz), where SDR will route the calls and SMS (short message services) messages over the SwiftBroadband link, even if Aircell ATG (Gogo Biz) is active.

In a preferred embodiment, the carrier for the smart phone can charge roaming rates, as the user is roaming on a Satcom Direct mobile network such as SATCOM DIRECT®. Passengers can subscribe to a roaming plan prior to departing on their trip. Smart phones that can be supported with the invention can include but are not limited to APPLE® iPHONE® 4, 4s, 5, 5s, 5c, 6 and 6 plus, as well as any Android phone running Android 4.0 or higher.

FIG. 2 are flowchart steps 100, 200, 210, 300, and 400 for loading and running a personal smart phone with the novel invention app. In a preferred embodiment, the traveling aircraft passenger can initiate using the invention by downloading the GlobalVT App. from an App. store, and register their mobile device (i.e. smart phone) and follow steps in FIG. 2 before takeoff of the aircraft. The mobile user switches their mobile device (i.e. smart phone) to in-flight mode and enable a Wi-Fi connection to the onboard router for the invention to work. So that during flight the mobile user is ready for two-way voice, SMS and data communications on their own mobile devices throughout the flight.

The recipients for calls from the mobile user, see the actual phone number of the mobile user's mobile communication device (i.e. smart phone) which goes both ways allowing for both parties to see the respective parties phone number and not an unknown phone number. For example, with outgoing calls, there is no +87 or other unknown number displayed when the mobile user makes their call, so the recipient is more likely to answer the call when the recipient sees the mobile user's phone number.

Bandwidth is optimized in the air, and the codec uses less than 16 kilobots per second for calls. Essentially, the invention requires a quarter of the bandwidth a cell band uses for the same call. The invention activates the simcard in the mobile user's mobile communication device (i.e. smart phone). The mobile user and the recipient is able to receive their calls where the calls ring directly through, with less than approximately one second of time delay. The invention functions as a global GSM (Global System for Mobile Communications) roaming service, routing all calls, data and text messages to the mobile user's communication device (i.e. smart phone) via satellite communication The invention has substantial cost benefits over using a piccocell or other expensive technologies on board the aircraft, which can costs approximately $250,000 to approximately a million dollars, in addition to the satellite system. The subject invention can be implemented for a fraction of the cost.

Although the preferred embodiment of the mobile device refers to a smart phone, the mobile device can include other types of portable digital communication devices, such as but not limited to tablets, laptops, and other portable computers, and the like, having communication capability with other devices.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A communication system comprising:
 a mobile software application installed on a mobile user device, the mobile user device having a telephone number;
 a communications gateway installed on a transportation vehicle, the communications gateway for providing wireless authentication and authorization for the mobile user device;
 a ground-based gateway, for proxying messages to and from the mobile user device, handling communications for the mobile user device, and messaging to and from the mobile user device; and
 an integrated communications gateway for providing functions of a BTS (Base Transceiver System) serving the mobile user device, a VLR (Visitors Location Register) for the mobile user device, and a SIP/SMPP (Session Initiation Protocol/Short Message Peer-to-Peer Protocol) communications router for the mobile user device.

2. The communication system of claim 1, wherein the wireless authentication and authorization includes:
 EAP-SIM (Extensible Authentication Protocol and Subscriber Identity Module) and/or EAP-AKA (Authentication and Key Agreement) Wi-Fi Protected Access 2, wireless authentication and authorization.

3. The communication system of claim 2, wherein the Ground-based gateway is for proxying RADIUS (Remote Authentication Dial-In User Service) messages, handling SIP (Session Initiation Protocol) communications and SMPP (Short Message Peer-to-Peer Protocol) SMS (short message services) messaging.

4. The communication system of claim 1, wherein the communications gateway includes satellite, air-to-ground and terrestrial communication links.

5. The communication system of claim 1, wherein the mobile application comprises:
- a voice and SMS (short message service) communications to the mobile device;
- a first registration with a ground based gateway as a SIP and SMPP client to allow VoIP (Voice Over Internet Protocol) and SMS signaling and communication; and
- a second registration with the Ground based gateway to trigger cellular roaming to provide the mobile User's telephone number to the Ground based gateway, which then proxies the registration request to the ICP I (Integrated Communications Platform).

6. The communication system of claim 2, wherein the communication gateway is installed on a mode of transportation for providing WPA2 (Wi-Fi Protected Access) Enterprise via at least one of EAP-SIM and EAP-AKA wireless authentication for the mobile device.

7. The communication system of claim 6, wherein the mode of transportation includes an aircraft.

8. The communication system of claim 3, wherein the EAP-SIM and/or EAP-AKA authorization uses the SIM (subscriber identity module) information inside the mobile device, and requests authorization from the mobile user's MO (mobile operator) to confirm a valid subscription for voice, SMS and roaming services.

9. The communication system of claim 1, wherein the ground based gateway provides a communications proxy or relay, wherein the gateway proxies the authentication from the communications gateway to the ICP.

10. The communication system of claim 1, wherein the ground based gateway provides an SIP and SMPP gateway for the mobile software application, allowing voice and data to be routed from the ICP to the mobile user device.

11. The communication system of claim 1, wherein the ground based gateway provides administrative functions, including housing the subscriber database of MSISDN (Mobile Station International Subscriber Directory Number used to identify a mobile phone number internationally) and phone numbers, and IMSI/ICCID (International Mobile Subscriber Identity/Integrated Circuit Card Identifier) information for mobile device users.

12. The communication system of claim 1, wherein the mobile device includes a smart phone.

13. The communication system of claim 1, wherein the mobile device is selected from one of a laptop computer, a tablet computer, and a portable computer.

14. The communication system of claim 1, further comprising:
Communications between the mobile communication device and a remote communication device, which provides the remote communication device with display of the telephone number of the mobile communication device during calls and text messages between the mobile communication device and the remote communication device.

* * * * *